United States Patent [19]

Davis et al.

[11] Patent Number: 5,019,543
[45] Date of Patent: May 28, 1991

[54] HIGH SILICA CRYSTALLINE ZEOLITES AND PROCESS FOR THEIR PREPARATION

[75] Inventors: Stephen M. Davis, Baton Rouge; W. Scott Varnado, Denham Springs, both of La.

[73] Assignee: Exxon Research & Engineering Company, Florham Park, N.J.

[21] Appl. No.: 375,446

[22] Filed: Jul. 5, 1989

[51] Int. Cl.$^5$ .................. B01J 29/06; B01J 29/08
[52] U.S. Cl. .................................. 502/64; 502/62; 502/79
[58] Field of Search .................. 502/60, 79, 62, 64

[56] References Cited

U.S. PATENT DOCUMENTS

| 4,093,560 | 6/1978 | Kerr et al. | 502/79 |
| 4,512,961 | 4/1985 | Scherzer et al. | 502/79 |
| 4,533,533 | 8/1985 | Dewing et al. | 502/60 |
| 4,840,930 | 6/1989 | LaPierre et al. | 502/79 |

Primary Examiner—Carl F. Dees
Attorney, Agent, or Firm—Chris P. Konkol; Roy J. Ott

[57] ABSTRACT

Crystalline aluminosilicate zeolites having increased silica to alumina mole ratios are prepared by a process wherein a conventional crystalline aluminosilicate zeolite is treated to remove alumina from the crystal lattice. By-product non-framework amorphous alumina is then selectively removed from the zeolite either by using a blocking agent, to prevent removal of framework aluminum during a subsequent acid treatment, or by using a selective organic acid extracting agent. The invention is also directed to high silica crystalline zeolites prepared by the present process.

29 Claims, No Drawings

HIGH SILICA CRYSTALLINE ZEOLITES AND PROCESS FOR THEIR PREPARATION

BACKGROUND OF THE INVENTION

The present invention is directed to an improved process for increasing the Si/Al ratio of a crystalline aluminosilicate zeolite. In particular, a process is disclosed for the selective removal of amorphous non-framework alumina from a zeolite. The present invention is also directed to the zeolites prepared by this process.

Crystalline aluminosilicate zeolites are essential ingredients in most catalysts for catalytic cracking of petroleum gas oils into blendstocks for premium transportation fuels. Preferred zeolites for cracking applications exhibit low sodium content ($\leq 0.3$ wt. %) and framework (Si/Al) atomic ratios in the range of about 8-30. Zeolites with these ratios promote high activity and selectivity for gas oil conversion into gasoline range products with low selectivity for undesirable hydrogen transfer and coking reactions. Unfortunately, zeolites with this composition are not readily available for incorporation into fresh cracking catalysts. Rather, fresh cracking catalysts are frequently prepared using rare-earth-Y (Si/Al~2.5), ultrastable-Y (Si/Al~5), or LZ-210 (Si/Al~3-8) type zeolites with low (Si/Al) ratios. During the cyclic cracking operation, the framework (Si/Al) ratio gradually increases due to periodic steaming in the catalyst regenerator. Hydrothermal dealumination in this manner produces a "detrital alumina" (amorphous non-framework) phase on the surface of the zeolite particles. This detrital alumina phase is undesirable because it tends to promote coking reactions and block access to the zeolite internal pore structure.

To minimize the impact of detrital alumina on catalyst performance, it would be very desirable to directly incorporate high (Si/Al) ratio zeolites in the catalyst preparation. The present invention herein described is directed to a method of preparing zeolites with high framework (Si/Al) ratios from corresponding zeolites with low (Si/Al) ratios such as USY or LZ-210. This method results in zeolites largely free of detrital alumina and retaining a high level of zeolite crystallinity. With appropriate choice of conditions, the framework (Si/Al) ratio can be tailored over a broad range of composition, e.g., (Si/Al)~8-50. High (Si/Al) ratio zeolites prepared in this manner are particularly effective as solid acid components in fluid cat cracking catalysts.

The present method of preparing high (Si/Al) ratio zeolites is based on a two-step procedure involving (1) hydrothermal dealumination, and (2) selective extraction of detrital alumina produced during the hydrothermal dealumination. Advantageously, the (Si/Al) ratio can be largely controlled by the initial steaming conditions.

The concept of steaming and acid extraction to produce high silica zeolites is not new. In previous work, extraction was carried out with common mineral acids such as HCl, $H_3PO_4$, $HNO_3$, and the like. A major drawback of this approach is based on the fact that mineral acid extraction is highly non-selective for detrital alumina. Indeed, mineral acids extract both framework and non-framework aluminum producing zeolites with low aluminum content, irregular aluminum distributions, and reduced crystallinity.

The prior art teaches possible methods of increasing silica to alumina mole ratios of crystalline aluminosilicate zeolites beyond either synthetic upper limits or that of the naturally occurring material. Several patents teach extraction of an aluminum from zeolite, however, not involving steaming prior to extraction. Pickert U.S. Pat. No. 3,640,621 discloses a process for producing high (Si/Al) faujasite by direct extraction of calcined zeolite with a non-acidic chelating agent such as acetylacetone. Young U.S. Pat. No. 3,691,099 teaches a process for improving the properties of oxides by direct extraction with mineral or organic acid salt solutions such that the pH is not so low as to destroy the crystalline structure of solid oxide. Chang et al U.S. Pat. No. 4,273,753 teaches a dealumination method based on direct reaction of a zeolite with an inorganic halide or oxyhalide at a high enough temperature to volatilize the resulting aluminum halide. U.S. Pat. No. 4,297,355 teaches modifying a zeolite by fluorine treatment in order to alter the zeolite's adsorption properties. Acid treatments of clays are disclosed in Maher et al U.S. Pat. No. 3,393,045 and Hildebrandt U.S. Pat. No. 3,492,088.

It is known to steam a zeolite in some cases prior to an extraction step. U.S. Pat. No. 3,493,519 to Kerr et al discloses producing a high (Si/Al) faujasite by steaming followed by extraction with a chelating agent at pH 7-9. The preferred chelating agent is the ammonium salt of ethylenediaminetetraacetic acid (EDTA). Eberly U.S. Pat. No. 3,506,400 teaches preparing a high silica zeolite by steaming and acid extraction of the zeolite. Eberly teaches that a chelating agent may be employed in place of an acid to remove non-framework amorphous alumina. Exemplary extracting agents in the Eberly patent are EDTA, sulfonic acid resin, and 0.1N HCl. The data in Tables III and VI of the Eberly patent show that framework aluminum is also leached during extraction under the conditions applied.

Another approach to zeolite modification is to protect sites in a zeolite by temporarily loading or covering with a foreign material during extraction. Dewing et al U.S. Pat. No. 4,533,533 teaches dealumination of framework sites near the external zeolite surface by protecting the interior with preadsorbed coke or other foreign material. Kokotailo et al U.S. Pat. No. 4,415,544 teaches surface modification of certain ZSM-type zeolites by contacting wax loaded materials with HF solutions. The latter two patents do not teach steaming prior to extraction.

BRIEF DESCRIPTION OF THE INVENTION

It is an object of the present invention to provide an improved method for increasing the silica to aluminum mole ratio in a crystalline aluminosilicate zeolite. It is a further object to provide a process and composition wherein amorphous alumina is selectively removed relative to framework alumina in a zeolite, that is, the aluminum atoms in the tetrahedral sites of the crystal lattice of the zeolite are not disturbed. It is a still further object of the present invention to retain a high level of crystallinity of the zeolite so as not to adversely affect its desired catalytic properties. It is a further object to remove amorphous alumina so as to eliminate or minimize undesirable effects such as increased coking or decreased activity in fluid catalytic cracking. Yet another object of the invention is to be able to control the (Si/Al) ratio of a zeolite largely by controlling the initial steaming or hydrothermal conditions. Still a further object of the invention is to provide a starting material for further ion exchange with additives or conditioning agents used to either improve the zeolite for its intended function or to protect it from premature deterioration. These and other objects of the present invention will be better understood with reference to the detailed description and preferred embodiments hereinafter given.

DETAILED DESCRIPTION OF THE INVENTION

The essence of the present invention is based on the discovery that non-framework detrital alumina can be selectively removed with respect to framework aluminum in a crystalline aluminosilicate zeolite. The first step in the process is to hydrothermally treat the zeolite material so as to increase the (Si/Al) ratio to the desired level by abstracting aluminum from the tetrahedral sites in the zeolite. This may be accomplished by heating the zeolite in the presence of steam or water for an effective amount of time until the desired (Si/Al) ratio is obtained. Suitably, the zeolite may be heat treated for a period of from about to 24 hours, preferably 4 to 16 hours, in the critical presence of water at temperatures in the range of about 800° to 1500° F., preferably 1000° to 1200° F. It is generally desired that at least 2% water be present in the treating gas, preferably at least 5%, and most preferably about 25%. In a preferred embodiment of the present invention, the acidic, e.g., hydrogen or hydrogen precursor such as ammonium, form of a crystalline aluminosilicate zeolite is treated with steam for a period of from about 4 to 24 hours, preferably 16 to 24 hours, at a temperature in the range of about 1000° to 1200° F. and a pressure of at least 10 p.s.i.a. to effectuate selective removal of alumina from the crystal lattice. The alumina so produced is in an amorphous form and remains within the gross structure of the zeolite. Much of this alumina concentrates at the exterior surface of the zeolite. The amount of amorphous alumina produced by the hydrothermal treatment or steaming of the zeolite material will to some extent depend on the type of zeolite. For example, a zeolite Y typically starts with about 25 percent alumina by weight, and following steaming, produces approximately a 1:1 ratio of framework to non-framework alumina. An LZ-2IO zeolite, in comparison, would start with a lower amount of alumina.

A second step in the present process is to selectively remove the amorphous alumina. This can be accomplished in various ways. In a first embodiment, the selective extraction is accomplished by a solvent displacement technique where the steamed zeolite is loaded with an adsorbed organic phase prior to treatment with dilute mineral acids such as HCl. Owing to the immiscibility of HCl in the organic phase, acid attack is restricted to the external surface of the zeolite particles. In this manner, detrital alumina can be selectively removed with little alteration of the framework (Si/Al) ratio.

A mixture of paraffinic hydrocarbons is effective as a blocking agent for HCl extraction. Suitable selectivity for detrital alumina removal is obtained by preloading the zeolite with a mixture of linear $C_{10}$–$C_{20}$ parafins and olefins which boil in the temperature range from about 320° to 550° F. This mixture of hydrocarbons represents part of the product distribution derived from hydrocarbon synthesis over CoRe/TiO$_2$. By way of comparison, when a heavier mixture of Fischer-Tropsch hydrocarbons is employed as a blocking agent, acid extraction is retarded to the extent that framework aluminum is totally protected and detrital alumina removal is incomplete. At the other extreme, when lighter hydrocarbons such as xylene and hexadecane are used as the blocking agent, selectivity may be lowered. Apparently, a part of the light organic phase may be displaced during the extraction procedure, which results in partial loss of framework aluminum in addition to removal of detrital $Al_2O_3$. However, in all cases, selectivity for detrital alumina removal is enhanced if the zeolite is loaded with hydrocarbons prior to acid extraction. Those skilled in the art will appreciate that numerous blocking agents, such as waxes, may be employed without undue experimentation.

Another method which can be utilized to selectively remove non-framework alumina from steamed faujasites involves a similar "protected framework" approach like that utilized with preadsorbed hydrocarbons. In this case, the zeolite is loaded with an unreactive carbonaceous deposit prior to acid extraction. Such deposits are frequently denoted as "coke" and can be produced readily by treating the zeolite with a hydrocarbon at elevated temperatures in the range of about 250°–600° C., preferably 400° –500° C. The coke deposits produced under these conditions are generally believed to represent partially dehydrogenated polymeric residues. These deposits are known to deactivate the zeolite for hydrocarbon conversion reactions, and this deactivation presumably arises from the fact that the deposit blocks access to framework aluminum centers that are the sites of catalytic activity. Once formed, the coke deposits can normally be removed only by burning the deposit in air or oxygen by coke combustion.

When steamed zeolites are loaded with coke and subsequently extracted with dilute HCl, the framework aluminum atoms are largely protected from acid attack. A clean high (Si/Al) ratio zeolite suitable for use as a catalyst or adsorbent is subsequently obtained by simply burning away the coke deposit.

Another method of selectively removing amorphous alumina from a zeolite is by the use of a selective acid extracting agent. A preferred agent is trichloroacetic acid or $Cl_3CCOOH$. Suitable extracting agents are generally strong soluble organic acids of a $pK_a$ or acidity, bulk, and polarity that tend to attack the outer amorphous alumina rather than framework alumina. Such agents include $Cl_xF_{3-x}CCOOH$, $RCF_2COOH$ and $RCCl_2COOH$, wherein x is 1, 2, or 3 and R is an organic substituents such as a phenyl group or an alkyl group of 1 to 10 carbon atoms, branched, unbranched or cyclic. Such acids provide high selectivity for detrital alumina ($Al_2O_3$) removal. Those skilled in the art will recognize that various other extracting agents, such as chelates, may be devised to accomplish the desired result. Evaluation of extracting agents for appropriate selectivity may be routinely carried out using X-ray photoelectron spectroscopy (XPS) and X-ray diffraction (XRD) as explained more fully in the examples below.

The selective removal or extraction according to the present process accomplishes the substantial removal of the amorphous (non-framework) alumina from the zeolite product. Preferably, the extraction is characterized by a selectivity for removing non-framework alumina over framework alumina of at least 3:1, more preferably at least 5:1, and most preferably at least 8:1. The resulting zeolite product preferably is less than about 5 wt. % non-framework alumina, more preferably about 2% or less. Typically, 80 to 90% or more of the non-framework is removed in the present process.

Suitable zeolites for use as a starting material for the process of the present invention are any of the naturally occurring or synthetic crystalline zeolites. Examples of these zeolites include the zeolites designated by the Linde Division of Union Carbide by the letters X, Y, A, L (These zeolites are described in U.S. Pat. Nos. 2,882,244; 3,130,007; 3,882,243; and 3,216,789, respectively.). Further examples include the naturally occurring crystalline zeolites such as faujasite, chabazite, erionite, mordenite, offretite, gmelinite, or analcite. Suitable zeolites are ZSM-5 zeolites such as described in U.S. Pat. No. 3,702,886; ferrosilicates; or borosilicate zeolites such as those described in Belgian Pat. No. 859656.

In general, the chemical formula of anhydrous crystalline metallosilicate zeolites expressed in terms of moles may be represented by the formula: $0.9\pm0.2M_{2/n}O:W_2O_3:ZSiO_2$, wherein M is selected from the group consisting of hydrogen, hydrogen precursors, monovalent, divalent and trivalent cations and mixtures thereof; n is the valence of the cation and Z is a number of at least 2, preferably at least 3, said value being dependent upon the particular type of zeolite. W, a metal in the anionic framework structure of the zeolite, may be aluminum, gallium, boron, or iron. Preferably, the zeolite is a crystalline aluminosilicate zeolite. More preferably, the zeolite is a Y-type zeolite. By "Y-type zeolite" is intended herein a zeolite having a silica to alumina mole ratio of at least about 3, the structure of faujasite and uniform pore diameters ranging from about 6 to about 15 Angstroms. Most preferably, the zeolite has a unit cell size below 24.7 Angstroms. For example, zeolites having unit cell size below about 24.5 Angstroms are known as "stablized" or "ultrastable". Preferred Y-type faujasites are described in U.S. Pat. No. 3,293,192; U.S. Pat. No. Re 28,629 (Reissue of U.S. Pat. No. 3,402,996); U.S. Pat. No. 4,036,739; U.S. Pat. No. 3,781,199 and U.S. Pat. No. 4,036,739. The zeolites as produced or found in nature normally contain an alkali metal cation such as sodium and/or potassium and/or an alkaline earth metal cation such as calcium and magnesium. The zeolites differ from each other in structure, composition and ratio of silica to metal oxide contained in the crystal lattice. For use as a hydrocarbon conversion catalyst component, it is usually necessary to decrease the alkali metal content of the crystalline metallosilicate zeolite to a content of less than 10 wt. %, preferably less than 6 wt. %, more preferably less than 1 wt. %. The alkali metal content reduction, as is known in the art, may be conducted by exchange with one or more cations selected from groups IB through VIII metals of the Periodic Table of Elements as well as with a hydrogen cation or hydrogen precursor (e.g. $NH_4+$) capable of conversion to the hydrogen cation. The Periodic Table of Elements referred to herein is given in the *Handbook of Chemistry and Physics*, published by the Chemical Rubber Publishing Company, Cleveland, OH 45th Edition, 1964. Preferred cations include rare earth metals, calcium, magnesium, hydrogen and mixtures thereof. Ion exchange methods are well-known in the art and are described, for example, in U.S. Pat. No. 3,140,249; U.S. Pat. No. 3,140,251 and U.S. Pat. No. 3,142,353, the teachings of which are hereby incorporated by reference.

For purposes of this invention, it is generally desired that more than 50% and preferably more than 75% of the original metal cations be exchanged with ammonium ion. The ammonium form is subsequently heated to a temperature in the range from about 600° to 1000° F. to produce the acid zeolite.

It has further been found that the structure of the heat treated product as well as its stability depend, to a large extent, on the method of calcination. Time, temperature and water content of the calcining gas all play a part. The effect of these variables in the preparation of a zeolite Y having a high silica to alumina mole ratio has been previously disclosed. The disclosure of co-assigned U.S. Pat. No. 3,506,400 is hereby incorporated by reference.

The process of the present invention will be still more clearly understood by reference to the following examples which are advanced for the purposes of illustration only and should not be taken as limiting the scope of the present invention in any way.

COMPARATIVE EXAMPLE 1

For comparison to results of the present invention, the following prior art non-selective extraction of detrital alumina with mineral acids was carried out.

A 200 g portion of Union Carbide zeolite LZ-210 was steamed for 16 hr at 650° C. Subsequently, several 15 g portions of this material were treated at 25°–60° C. with mineral acid solutions containing about 10 g zeolites per 100 cc in an effort to dissolve away the detrital alumina produced during steaming. Subsequently, the acid extracted zeolites were dried in a vacuum oven at 120° C. Selected samples were also post-calcined to 500° C. The concentrations of detrital $Al_2O_3$ present before and after steaming and acid extraction were determined using X-ray photoelectron spectroscopy (XPS). This determination is based on the fact detrital alumina concentrates at the external surface of the zeolite particles where it is most easily detected using surface sensitive techniques such as XPS. The framework aluminum content of the zeolites was determined using powder X-ray diffraction (XRD). Unit cell sizes, $a_o$, were deduced directly from the XRD line positions and converted to framework (Si/Al) ratios with the aid of the following Breck-Flanigan equation $$\left(\frac{Si}{Al}\right) = \frac{5}{3}(a_0 - 24.19)^{-1} - 1$$

Table I compares surface and bulk composition results for LZ-210 after a variety of treatments. As expected, hydrothermal dealumination by steaming at 650° C. caused the framework (Si/Al) ratio to increase and the surface (Si/Al) ratio to decrease. The latter effect arises from the concentration of non-framework aluminum at the external zeolite surface. After treatment with mineral acids the surface and framework (Si/Al) ratios both increased sharply indicating that detrital and framework aluminum are both non-selectively extracted during this procedure. As indicated in Table II, very similar behavior characterized by non-selective Al extraction were obtained when USY (steamed 16 hr at 650° C. was treated with mineral acids. With mineral acid extraction, the surface and framework (Si/Al) ratios become comparable only at a very low framework Al content.

TABLE I

Prior Art Non-Selective Extraction of Steam
LZ-210 With Mineral Acids

| Pretreatment | Surface (Si/Al) by XPS | Unit Cell Size (Å) by XRD | Framework (Si/Al) |
|---|---|---|---|
| None | 7.8 | 24.47 | 5.0 |
| STM-650° C.-16 hr. | 2.0 | 24.37 | 8.3 |
| $H_3PO_4$ (pH = 1.5) | ≧30 | 24.24 | 32 |
| $H_3PO_4/HNO_3$ (pH = 1.4) | ≧60 | 24.24 | 32 |
| HCl (pH = 1.6) | 4.3 | 24.37 | 8.3 |
| HCl (pH = 0.95) | ≧40 | 24.26 | 23 |

TABLE II

Non-Selective Extraction of Steamed
USY With Mineral Acids

| Pretreatment | Surface (Si/Al) by XPS | Unit Cell Size (Å) by XRD | Framework (Si/Al) |
|---|---|---|---|
| STM-650° C.-16 hr. | 1.2 | 24.36 | 8.8 |
| HCl (pH = 1.0) | 2.9 | 24.31 | 13 |
| HCl (pH = 0.7) | 9 | 24.22 | 55 |
| 1.5% HF | 2.7 | 24.32 | 12 |
| 10% HF | 30 | 24.20 | >100[1] |
| EDTA (pH = 3.4) | 1.8 | — | |

[1]This product displayed poor crystallinity.

EXAMPLE 2

A selective extraction of detrital alumina ($Al_2O_3$) with trichloroacetic acid ($Cl_3CCOOH$) according to one embodiment of the present invention was carried out as follows.

The steamed LZ-210 zeolite described in Example 1 was also treated with trichloroacetic acid at several different concentrations in an effort to selectively extract the unwanted detrital $Al_2O_3$ phase. Table III below compares surface and framework composition results. The extraction occurred with little or no change in zeolite unit cell size indicating that the framework aluminum concentration was largely unchanged during $Cl_3CCOOH$ extraction. For $Cl_3CCOOH$ concentrations below about 0.1 M and extraction times near 1 hr, detrital $Al_2O_3$ removal was not complete. For high $Cl_3CCOOH$ concentrations above about 0.4 M, the extraction procedure became non-selective resulting in substantial loss of framework aluminum. Based on these results, it appears that selective extraction of detrital $Al_2O_3$ is most preferably carried out with $Cl_3CCOOH$ concentrations in the range of about 0.1–0.3 M. In this circumstance, zeolites with framework (Si/Al) ratios in the range of 8–20 can be readily prepared. The surface composition of these materials closely resembles the bulk framework composition.

TABLE III

Selective Extraction of Detrital
$Al_2O_3$ In Steamed LZ-210

| Pretreatment | Surface (Si/Al) by XPS | Unit Cell Size (Å) by XRD | Framework (Si/Al) |
|---|---|---|---|
| STM-650° C.-16 hr. | 2.0 | 24.37 | 8.3 |
| 0.05M $Cl_3CCOOH$ | 3.4/3.2 | 24.36 | 8.8 |
| 0.1M $Cl_3CCOOH$ | 6.5/6.9 | 24.36 | 8.8 |
| 0.2M $Cl_3CCOOH$ | 10/9.6 | 24.34 | 10.1 |
| 0.6M $Cl_3CCOOH$ | 60/50 | 24.26 | 23 |

EXAMPLE 3

A selective extraction of detrital alumina according to a second embodiment of the present invention involved protection of the framework alumina with coke as follows. A sample of LZ-210 was steamed overnight at 750° C. using wet air containing about 2.6 mole % water. The resulting steamed LZ-210 displayed a unit cell size of 24.34 Å. A 5 g portion of this material was loaded into a tubular reactor and treated with a hydrocarbon feed containing 10 wt. % biphenyl in hexadecane. The treat was carried out in the presence of flowing nitrogen. The treat was initially carried out at 400° C. and after one hour, the temperature was raised to 500° C. for an additional two hours. Combustion analysis revealed that a coke loading of 9.5 wt. % on zeolite was produced by this procedure. Subsequently, a 3.5 g portion of the coked zeolite was added to 150 cc of a dilute HCl solution with a pH equal to 0.65. The mixture was slurried for 3–4 hours at 70°–80° C., after which the zeolite was collected by filtration, dried, and calcined in air at 545° C. for 3 hours. This air treatment was sufficient to completely remove the residual coke deposit. For comparison, the steamed but not precoked LZ-210 was HCl extracted and calcined under the same conditions. After calcination, both zeolites were analyzed for unit cell size by XRD and surface composition by photoelectron spectroscopy. Results are tabulated in Table IV.

TABLE IV

Surface and Bulk Composition
Results For LZ-210 Zeolites

| LZ-210 Pretreat | Unit Cell Size (A) | Framework (Si/Al) | Surface (Si/Al) |
|---|---|---|---|
| Steamed 750° C. - 16 hr | 24.34 | 10.1 | 2.0 |
| Steamed 750° C., Extracted with 0.65 pH HCl, Calcined 545° C. | 24.25 | 26.8 | 50 |
| Steamed, Coked, Extracted & Calcined | 24.33 | 10.9 | 15 |

It can be easily seen that non-framework alumina was eliminated from the surface of the precoked zeolite without significant loss of framework aluminum sites. By contrast, direct extraction without precoking resulted in a large loss of framework aluminum sites in addition to non-framework alumina. As such it appears clear that precoking prior to acid extraction can be conveniently applied to effectively protect framework sites.

EXAMPLE 4

A selective extraction of detrital alumina according to another embodiment of the present invention involved protection of the framework alumina with preadsorbed hydrocarbons as follows. A 200 g portion of Union Carbide zeolite LZ-210 was steamed for 4 hours at 600° C. Subsequently, several 15 g portions of this material were slurried for a period of about 40 minutes at room temperature with 210 cc of a dilute HCl solution which initially measured a pH of 0.95. In the control experiment, steamed LZ-210 was added directly to the HCl solution. In the other experiments, the steamed zeolite was loaded with an adsorbed organic hydrocarbon prior to contacting with the HCl solution. Hydrocarbon adsorption was accomplished by simply adding zeolite to a beaker of the liquid organic phase and collecting the hydrocarbon loaded zeolite by vacuum filtration in air. Subsequently, the hydrocarbon loaded zeolites were added to the aqueous HCl solutions. All of the zeolites were vigorously agitated with a magnetic stirrer during the period of HCl extraction. After extraction, the zeolites were collected by filtration, vacuum dried to 110° C. for 16 hr and post-calcined for 1-3 hr at 530° C. The concentrations of detrital $Al_2O_3$ present before and after steaming and acid extraction were determined using X-ray photoelectron spectroscopy (XPS) and the framework aluminum content of the zeolites was determined using powder X-ray diffraction (XRD).

Table V below compares surface and bulk composition results for steamed LZ-210 after a variety of treatments. As expected, hydrothermal dealumination caused the framework (Si/Al) ratio to increase and the surface (Si/Al) ratio to decrease. The latter effect arises from the concentration of non-framework aluminum at the external zeolite surface. After direct extraction with HCl the surface and framework (Si/Al) ratios both increased sharply indicating that detrital and framework aluminum are both non-selectively extracted during this procedure. However, with the zeolites which were preloaded with organic hydrocarbons, the leaching of framework aluminum was greatly retarded. In this case, detrital $Al_2O_3$ was selectively extracted from the external zeolite surface while the framework aluminum concentration remained largely unchanged. In all cases, selectivity for detrital $Al_2O_3$ removal is enhanced if the zeolite is loaded with hydrocarbons prior to acid extraction.

TABLE V

Surface and Bulk Composition Results For Steamed LZ-210

| Pretreatment | Surface (Si/Al) by XPS | Unit Cell Size (Å) by XRD | Framework (Si/Al) |
|---|---|---|---|
| None | 7.8 | 24.47 | 5.0 |
| STEAMED-600° C.-4 hr. | 2.3 | 24.38 | 7.8 |
| HCl (pH = 0.95) | 50/28 | 24.26 | 23 |
| Presoak Xylene/HCl (pH = 0.95) | 16 | 24.31 | 13 |
| Presoak $C_{16}H_{34}$/HCl (pH = 0.95) | 16/14 | 24.31 | 13 |
| Presoak 320-550 F-T product/HCl (pH = 0.95) | 9.2/9.2 | 24.37 | 8.3 |
| Presoak 550/650 F-T product/HCl (pH = 0.95) | 4.7/5.4 | 24.39 | 7.4 |

EXAMPLE 5

The modified zeolites of this invention can be used as catalysts in a variety of applications such as catalytic cracking or hydrocracking of petroleum based hydrocarbons. As an example, Table VI below summarizes results of catalytic cracking experiments using composite catalysts containing 30 wt. % zeolite and 70 wt. % 3Å-matrix. The 3Å-matrix material represents an amorphous silica alumina which nominally contains 25 wt. % $Al_2O_3$ and 75 wt. % $SiO_2$. The composite catalysts were prepared by slurrying carefully weighted mixtures of dry zeolite and matrix powders in aqueous 5% $NH_4NO_3$, followed by filtration, rinsing with deionized water, oven drying to 120° C. overnight, and air calcination at 427° C. for 3 hours. Three catalysts were investigated:

(A) A standard reference catalyst which contained commercially available LZY-82 (Union Carbide Corp.) as the zeolitic component;

(B) An experimental catalyst which contained a modified zeolite that was prepared by steaming LZ-210 at 650° C. overnight followed by extraction with 0.2 M $Cl_3CCOOH$ and calcination at 525° C.; and (C) An experimental catalyst which also contained an extracted, partially dealuminated zeolite like (B). In this case, the zeolite was further modified by exchange with a rare earth brine solution containing rare earth cations (La & Ce) at a concentration of about 0.15 moles per liter. Exchange was conducted at about 80° C. for 4-6 hours, the zeolite was collected by filtration, dried, and calcined at 525° C. before further use which resulted in a rare earth oxide loading of 2.1 wt. % as measured by chemical analysis.

Prior to testing for catalytic activity, the composite catalysts were steam treated for 16 hours at atmospheric pressure and 760° C. to simulate the catalyst equilibration conditions of a commercial cat cracking regenerator. The catalysts were evaluated for catalytic cracking activity in standard microactivity tests (MAT) using a gas oil hydrocarbon feedstock. Table VI below summarizes results of the MAT studies. Specific coke is given by (coke make)×(1-conversion)/(conversion) and represents intrinsic selectivity for producing undesirable coke. Within the uncertainty of the experimental data, the catalytic activity and selectivity of the experimental catalyst (B) was essentially comparable to the standard catalyst (A). The experimental catalyst (C), which contained rare earth cations, displayed much improved activity and selectivity relative to the standard catalyst. This example demonstrates that the modified zeolites of this invention are effective as catalyst components and further demonstrates that these zeolites retain useful ion exchange characteristics.

TABLE VI

MAT Catalytic Behavior of Experimental Cracking Catalysts

| Catalyst | A | B | C |
|---|---|---|---|
| Conversion (wt %) | 59.1 | 58.3 | 71.2 |
| $H_2$ Yield (wt %) | 0.023 | 0.020 | 0.017 |
| Coke Yield (wt %) | 1.28 | 1.53 | 1.76 |
| Specific Coke | 0.89 | 1.09 | 0.71 |

EXAMPLE 6

To more clearly assess the catalytic properties of the rare-earth containing zeolites, a second set of MAT studies was carried out using three catalysts, all of which contained rare earth exchanged zeolites. As before, the catalysts were prepared by compositing 30 wt. % zeolite with 70 wt. % 3Åmatrix, and the composite catalysts were steamed at 760° C. for 16 hours prior to evaluation. The zeolites included in these catalysts were prepared as follows;

(D) LZ-210 (Union Carbide Corp.) was exchanged with rare earth brine, followed by drying, and calcination at 525° C. The rare earth containing zeolite was then steam treated at 650° C. for 16 hours prior to producing the composite catalyst. Analysis revealed a rare earth oxide loading of 8.1 wt. % along with a unit cell size of 24.46Å.

(E) LZ-210 was steam treated for 16 hours at 650° C. and subsequently exchanged with rare earth brine. The zeolite was collected by filtration, dried, and calcined in air at 525° C. before producing the composite catalyst. Analysis revealed a rare earth oxide content of 2.6 wt. % and a unit cell size of 24.34Å.

(F) LZ-210 was steam treated at 650° C. for 16 hours. Subsequently, the zeolite was extracted with 0.25M Cl$_3$CCOOH to remove non-framework alumina produced during the steaming process. After drying and calcination at 525° C., the extracted zeolite was exchanged with rare earth brine using the same procedure as zeolites (D) and (E). After drying and recalcination, analysis revealed a rare earth oxide content of 1.4 wt. % and a unit cell size of 24.32Å.

Table VII compares the MAT catalytic behavior of catalysts containing zeolites (D) to (F). The catalyst containing the acid extracted, rare earth exchanged zeolite displayed high activity for gas oil conversion to gasoline range products along with a low selectivity for producing undesirable coke. These beneficial features were realized with a lower rare earth content than is normally possible with catalysts described in the prior art, eg. catalysts containing rare earth exchanged zeolites like (D). This example again shows that the zeolites of this invention display useful catalytic and ion exchange properties.

TABLE VII

| MAT Catalytic Behavior of Experimental Cracking Catalysts | | | |
|---|---|---|---|
| Catalyst | D | E | F |
| Conversion (wt %) | 63.0 | 67.3 | 67.2 |
| H$_2$ Yield (wt %) | 0.028 | 0.019 | 0.030 |
| Coke Yield (wt %) | 1.80 | 2.07 | 1.63 |
| Specific Coke | 1.06 | 0.92 | 0.79 |

It is evident that the process of the present invention can be utilized to produce crystalline zeolites having preselected high silica to alumina mole ratios and which have been further modified by impregnation with selected metal ions or compounds so as to produce specifically desirable compounds as catalysts for selected reactions. For example, it is within the scope of the present invention to impregnate the product of the present inventive process with such metal cations as silver, calcium, beryllium, barium, magnesium, zinc, aluminum, titanium, zirconium, chromium, iron, manganese, cerium, the rare earth metals, platinum, palladium, and mixtures thereof. It is also possible to form composites of the high silica to alumina mole ratio crystalline molecular sieves with other aluminosilicates or with catalytically active compounds of molybdenum, tungsten, palladium, platinum, and the like. Other variations in the process and products of the present invention will be evident to one skilled in the art.

What is claimed is:

1. A process for increasing the silica to aluminum (Si/Al) mole ratio in the crystal lattice of a crystalline aluminosilicate zeolite, said process comprising:
   (1) hydrothermally treating said zeilite for a period of time sufficient to effect removal of alumina from said crystal lattice, thereby increasing the Si/Al ratio of the zeilite and forming a non-framework amorphous phase alumina by-product on said zeolite; and
   (2) extracting the amorphous phase alumina selectively with respect to the alumina in said crystal lattice of said zeolite to produce a zeolite product substantially retaining its degree of framework crystallinity with respect to the dealuminized zeolite produced in step (1),
   said extracting step being carried out by one of the following processes:
   a) contacting the treated zeolite of step (1) with a solution of an organic acid selected from the group consisting of Cl$_x$ F$_{3-x}$ COOH, RCF$_2$ COOH or RCCl$_2$ COOH, wherein x is 1, 2 or 3 and R is phenyl or an alkyl group having from 1 to 10 carbon atoms, for a sufficient time and under process conditions suitable to remove a substantial portion of the amorphous phase alumina from said zeolite; or alternatively
   b) loading the treated zeolite of step (1) with an organic blocking agent to block access to the framework aluminum centers of the zeolite, and contacting said blocked zeolite with a solution of an extracting agent for sufficient time and under process conditions suitable to remove a substantial portion of the amorphous phase alumina from said zeolite.

2. The process of claim 1, wherein the unit cell size of the zeolite product is below 24.5.

3. The process of claim 1, wherein the unit cell size of the zeolite product is 24.5 to 24.2.

4. The process of claim 1, wherein said hydrothermal treating is performed at a temperature within the range of about 800° to 1500° F. in an atmosphere containing at least 2% water.

5. The process of claim 1, wherein the temperature, time, and water content is such to obtain a Si/Al ratio of the zeolite product of at least about 8.

6. The process of claim 1 wherein the zeolite treated in step (1) is a faujasite type zeolite.

7. The process of claim 1 wherein said zeolite treated in step (1) has an initial silica to alumina ratio of about 2.0 to 8.

8. The process of claim 7, wherein said zeolite has an initial silica to alumina ratio of about 2.5 to 5.

9. The process of claim 1 wherein the selectivity for removing non-framework alumina over framework alumina is at least 3:1.

10. The process of claim 9, wherein the selectivity for removing non-framework alumina over framework alumina is at least 5:1.

11. The process of claim 1, wherein less than about 5 percent by weight of the zeolite product is non-framework alumina.

12. The process of claim 1, wherein less than about 2 percent by weight of the zeolite product is non-framework alumina.

13. The process of claim 1, wherein the amorphous alumina is selectively extracted in accordance with process (a).

14. The process of claim 13, wherein the organic acid is trichloroacetic acid.

15. The process of claim 1, wherein the selective extraction is accomplished by using an organic blocking agent prior to extraction in accordance with process (b).

16. The process of claim 15, wherein the blocking agent comprises a hydrocarbon having 10 to 20 carbon atoms or mixtures thereof.

17. The process of claim 16, wherein the blocking agent comprises paraffins, olefins, or mixtures thereof.

18. The process of claim 15, wherein the blocking agent comprises a hydrocarbonaceous coke deposit produced by heating the zeolite in the presence of a hydrocarbon.

19. The process of claim 1, wherein the sodium content of the zeolite product is less than or equal to about 0.3 weight percent.

20. The process of claim 1 where said zeolite product has a final Si/Al mole ratio of about 8 to 50.

21. The process of claim 1, wherein the zeolite product of step (2) is subsequently ionexchanged or treated with an additive.

22. The process of claim 21, wherein the additive is a catalytic metal employed in hydrocracking, reforming, or hydrotreating.

23. The process of claim 21, wherein the additive is an aluminosilicate additive used to make a composite catalyst.

24. The process of claim 1, wherein the zeolite treated in step (1) is a Y-type zeolite.

25. The process of claim 14 wherein the concentration of said acid in solution is within the range of from about 0.1 up to about 0.4 M.

26. The process of claim 15 wherein said extracting agent is hydrochloric acid.

27. The process of claim 15 wherein said zeolite treated in step (1) has an initial silica to alumina ratio of about 2.0 to 8.

28. The process of claim 15 wherein said blocking agent is removed from said zeolite after said extraction step.

29. The process of claim 28 wherein said blocking agent is removed by heating the zeolite at high temperatures in the presence of oxygen.

* * * * *